US010274800B2

(12) United States Patent
Tsai et al.

(10) Patent No.: US 10,274,800 B2
(45) Date of Patent: Apr. 30, 2019

(54) DISPLAY DEVICE

(71) Applicant: InnoLux Corporation, Miao-Li County (TW)

(72) Inventors: Tsung-Han Tsai, Miao-Li County (TW); Chien-Hung Chen, Miao-Li County (TW); Mei-Chun Shih, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 176 days.

(21) Appl. No.: 15/272,833

(22) Filed: Sep. 22, 2016

(65) Prior Publication Data

US 2017/0090261 A1 Mar. 30, 2017

(30) Foreign Application Priority Data

Sep. 30, 2015 (CN) .......................... 2015 1 0638234

(51) Int. Cl.
*G02F 1/1337* (2006.01)
*G02F 1/1343* (2006.01)
*G02F 1/1362* (2006.01)

(52) U.S. Cl.
CPC .. *G02F 1/136286* (2013.01); *G02F 1/133707* (2013.01); *G02F 1/134309* (2013.01); *G02F 1/134336* (2013.01); *G02F 1/134363* (2013.01); *G02F 2001/134345* (2013.01); *G02F 2001/134372* (2013.01); *G02F 2201/121* (2013.01); *G02F 2201/56* (2013.01)

(58) Field of Classification Search
CPC ............... G02F 2001/134345; G02F 1/134309
See application file for complete search history.

(56) References Cited

U.S. PATENT DOCUMENTS

| 2009/0251654 | A1* | 10/2009 | Itou | G02F 1/134363 349/141 |
| 2010/0079712 | A1* | 4/2010 | Tanaka | G02F 1/133512 349/123 |
| 2012/0044446 | A1* | 2/2012 | Hara | G02F 1/134309 349/139 |
| 2012/0127148 | A1* | 5/2012 | Lee | G02F 1/134363 345/212 |
| 2013/0258255 | A1* | 10/2013 | Fang | G02F 1/134363 349/96 |
| 2016/0103359 | A1* | 4/2016 | Kimura | G02B 5/201 349/33 |
| 2017/0038655 | A1* | 2/2017 | Cheng | G02F 1/1343 |
| 2018/0017832 | A1* | 1/2018 | Sakai | G02F 1/134363 |

* cited by examiner

*Primary Examiner* — Alexander P Gross
(74) *Attorney, Agent, or Firm* — McClure, Qualey & Rodack, LLP

(57) ABSTRACT

A display device is provided. The display device includes a first substrate, a second substrate, a liquid-crystal layer, a first electrode, and an opposite electrode. The liquid-crystal layer is disposed between the first substrate and the second substrate. The first electrode is disposed on the first substrate. The opposite electrode is disposed on the side of the second substrate that faces the first substrate. The first electrode includes a first main portion and a plurality of first extending portions. The first extending portions are connected to the first main portion, at least one of the first extending portions includes a first side, a second side, and a curved structure. The curved structure connects the first side to the second side, and the curved structure has a first curvature radius greater than zero.

19 Claims, 13 Drawing Sheets

DISPLAY DEVICE

CROSS REFERENCE TO RELATED APPLICATIONS

This Application claims priority of China Patent Application No. 201510638234.3, filed on Sep. 30, 2015, the entirety of which is incorporated by reference herein.

BACKGROUND OF THE INVENTION

Field of the Invention

The present disclosure relates to a display device, and in particular to a display device with a disclination line.

Description of the Related Art

Conventional display device includes a first substrate, a second substrate, a liquid-crystal layer, and an electrode. The liquid-crystal layer is disposed between the first substrate and the second substrate. The electrode is disposed on the first substrate. Conventionally, the electrode includes a plurality of branches, and corners are formed on the ends of the branches. Finding a way to improve the light transmittance and the response time is an important issue of the display technology.

BRIEF SUMMARY OF THE INVENTION

In one embodiment, a display device is provided. The display device includes a first substrate, a second substrate, a liquid-crystal layer, a first electrode, and an opposite electrode. The liquid-crystal layer is disposed between the first substrate and the second substrate. The first electrode is disposed on the first substrate. The opposite electrode is disposed on the side of the second substrate that faces the first substrate. The first electrode comprises a first main portion and a plurality of first extending portions. The first extending portions are connected to the first main portion, and at least one of the first extending portions comprises a first side, a second side, and a curved side. The curved side connects the first side and the second side, and the curved side has a first curvature radius greater than zero.

In another embodiment, a display device is provided. The display device includes a first substrate, a second substrate, a liquid-crystal layer, a first electrode, and an opposite electrode. The liquid-crystal layer is disposed between the first substrate and the second substrate. The first electrode is disposed on the first substrate. The opposite electrode is disposed on the side of the second substrate that faces the first substrate. The first electrode comprises a first main portion and a plurality of first extending portions. The first extending portions are connected to the first main portion, and at least one of the first extending portions comprises a first side, a second side, and a curved side. The curved side connects the first side and the second side. The first side connects the first main portion at a first end point. The second side connects the first main portion at a second end point. The curved side connects the first side at a third end point. The curved side connects the second side at a fourth end point. The area of the first extending portion is greater than the quadrilateral area enclosed by the first, second, third, and fourth end points.

In another embodiment, a display device is provided. The display device includes a first substrate, a second substrate, a liquid-crystal layer, a first sub-pixel area, and a second sub-pixel area. The liquid-crystal layer is disposed between the first substrate and the second substrate. A disclination line structure is between the first sub-pixel area and the second sub-pixel area, and the disclination line structure comprises a disclination line main portion and a plurality of top indentations. A virtual line segment is defined at a location where one of the top indentations connect to the disclination line main portion. The virtual line segment is parallel to the extending direction of the disclination line main portion. The one of the top indentation comprises a first disclination line side and a second disclination line side. The first disclination line side is relatively adjacent to the center of the disclination line main portion. The second disclination line side is relatively away from the center of the disclination line main portion. A first included angle between the first disclination line side and the virtual line segment is greater than a second included angle between the second disclination line side and the virtual line segment, and the first included angle and the second included angle are inside the top indentation.

Utilizing the curved side mentioned above, the arrangement of the liquid-crystal molecules is improved, and the light transmittance and the response time response time are improved. Additionally, utilizing the disclination line structure of the embodiment, the retention time is decreased, and the visual angle is made uniform.

A detailed description is given in the following embodiments with reference to the accompanying drawings.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE INVENTION

Figure 1:
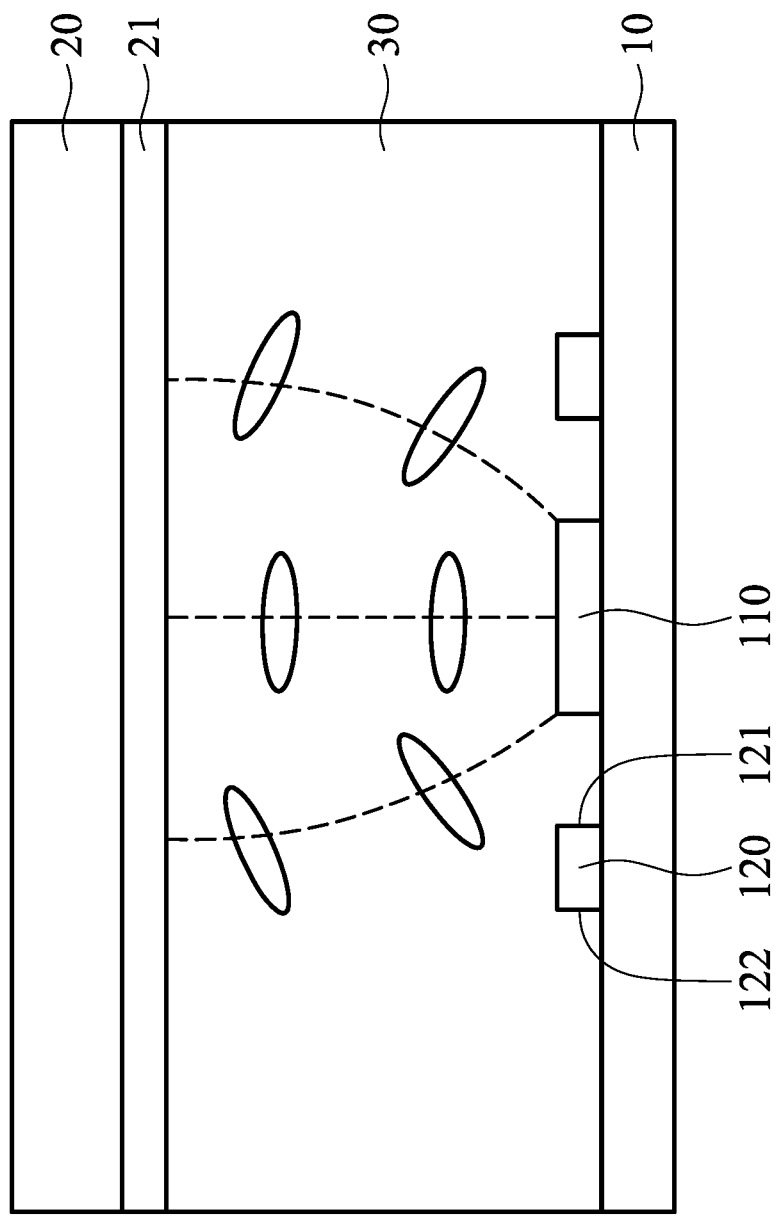
FIG. 1 is a cross sectional view of the display device of the embodiment.

FIG. 1 shows a display device 1 of a first embodiment. The display device 1 includes a first substrate 10, a second substrate 20, a liquid-crystal layer 30, a first electrode 100, and an opposite electrode 21. The liquid-crystal layer 30 is disposed between the first substrate 10 and the second substrate 20. The first electrode 100 is disposed on the first substrate 10. The opposite electrode 21 is disposed on the side of the second substrate 20 that faces the first substrate 10. In more detail, the liquid-crystal layer 30 is disposed between the first electrode 100 and the opposite electrode 21.

Figure 2A:
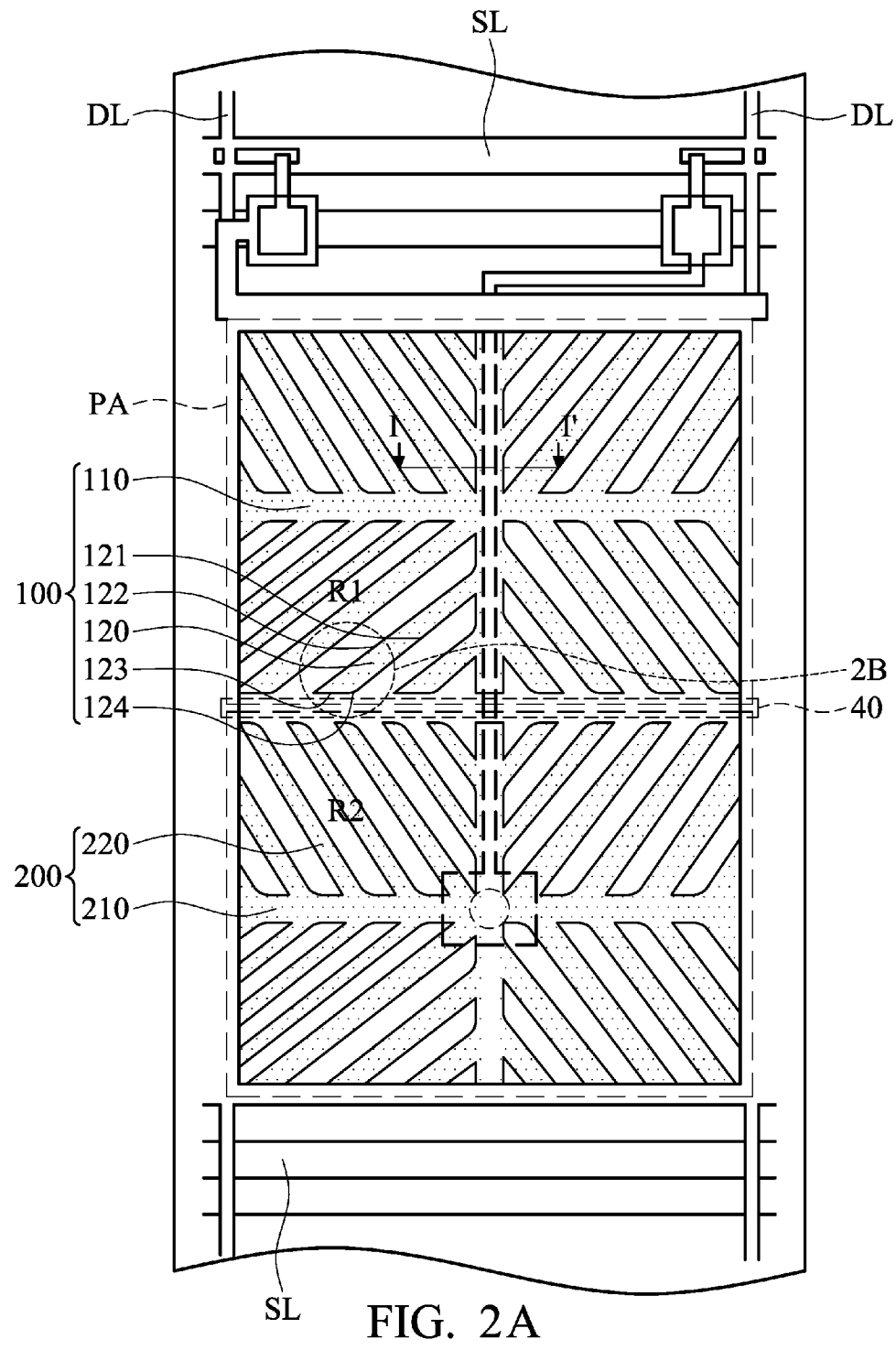
FIG. 2A shows the main structure of the display device of the embodiment.
Figure 2B:
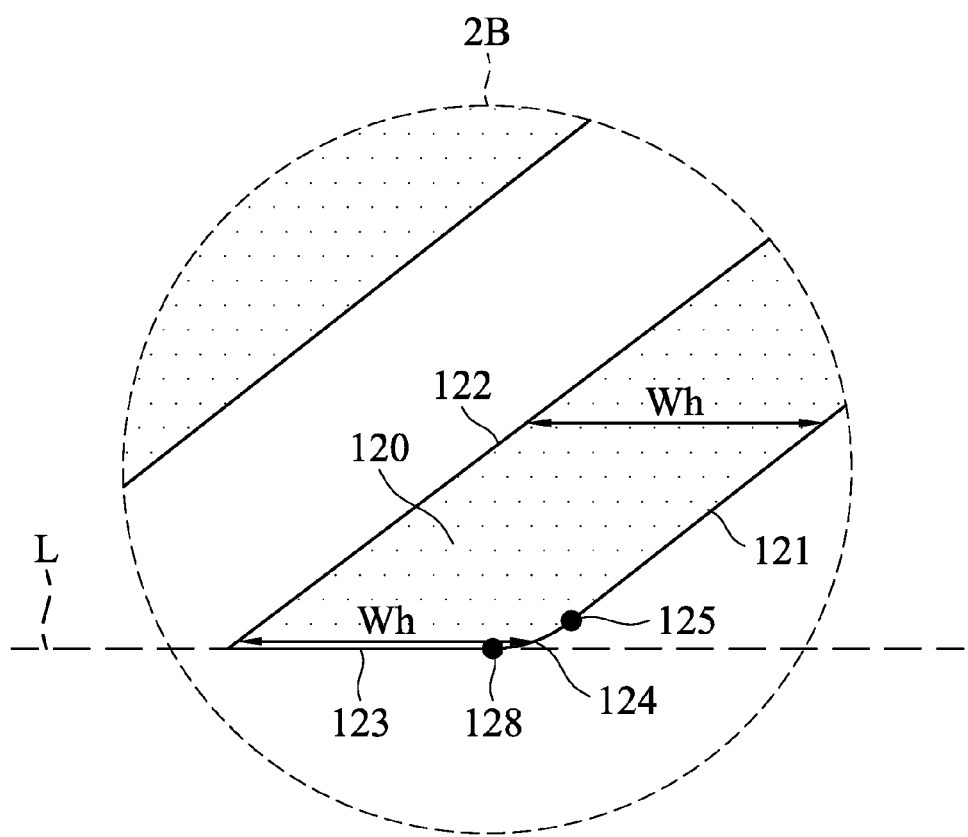
FIG. 2B is an enlarged view of portion 2B of FIG. 2A.

FIG. 2A shows the main structure of the display device 1. The first electrode 100 comprises a first main portion 110 and a plurality of first extending portions 120. The first extending portions 120 are connected to the first main portion 110. In one embodiment, the first main portion 110 is a cross-shaped electrode with horizontal axes and vertical axes. An included angle between the horizontal axes or the vertical axes of the first extending portions 120 and the first main portion 110 is between 10 degrees and 80 degrees. FIG. 1 is a cross sectional view along I-I' direction of FIG. 2A. With reference to FIGS. 2A and 2B, at least one of the first extending portions 120 comprises a first side 121, a second side 122 and a curved side 123. At FIG. 1, a horizontal distance between the first side 121 and a point of the vertical axis of the first main portion 110 is shorter than a horizontal distance between the second side 122 and the point of the vertical axis of the first main portion 110. In another words, the first side 121 is relatively adjacent to the vertical axis of the first main portion 110. The second side 122 is relatively away from the vertical axis of the first main portion 110. The curved side 123 includes a first round corner 124. The first round corner 124 includes a first round corner end 125 connected to the first side 121. The first round corner 124 has a first curvature radius greater than zero. In one embodiment, the first curvature radius is smaller than or equal to 5 µm. In one embodiment, the first side 121 is parallel to the second side 122.

Figure 3A:
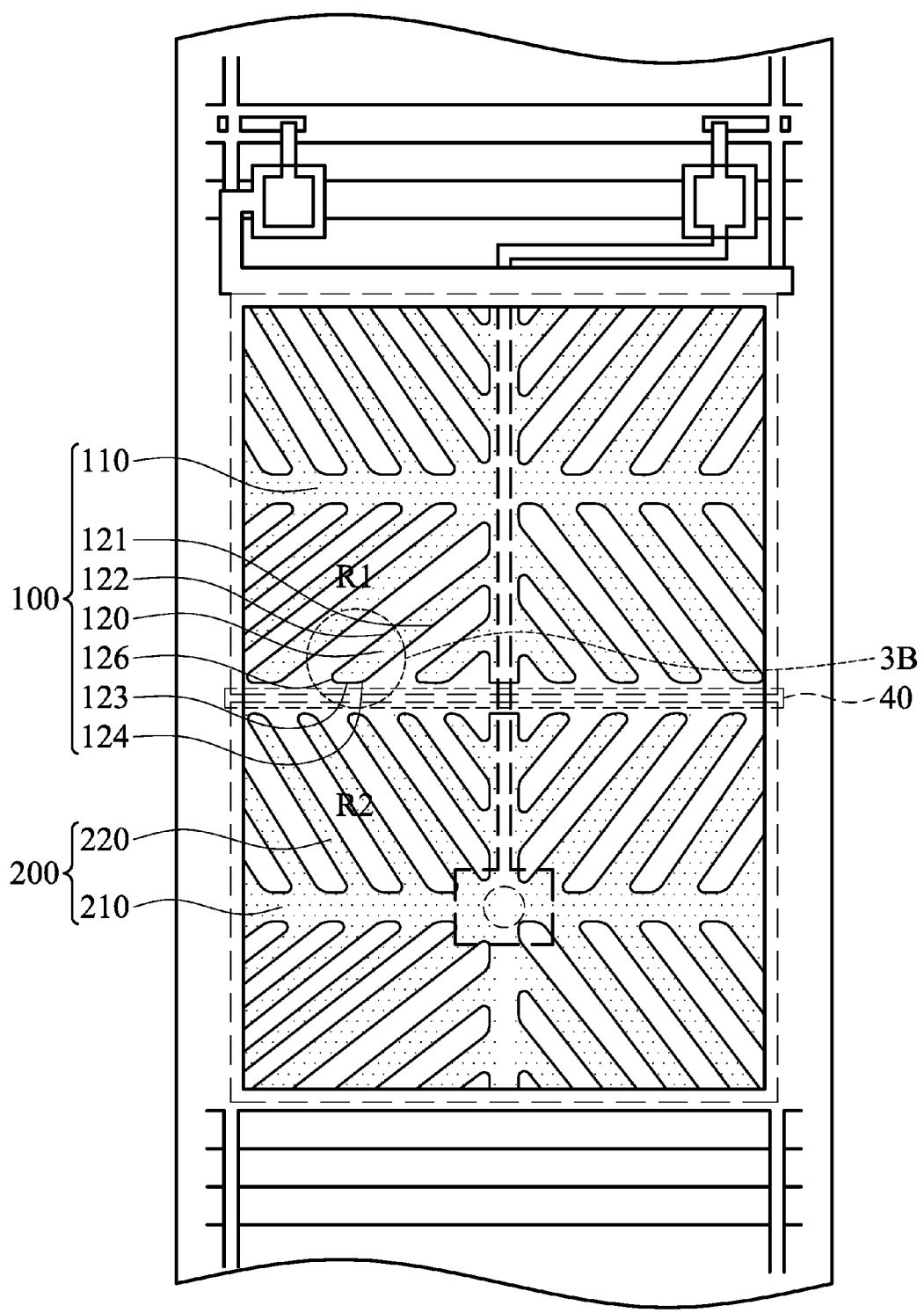
FIG. 3A shows the main structure of the display device of another embodiment.
Figure 3B:
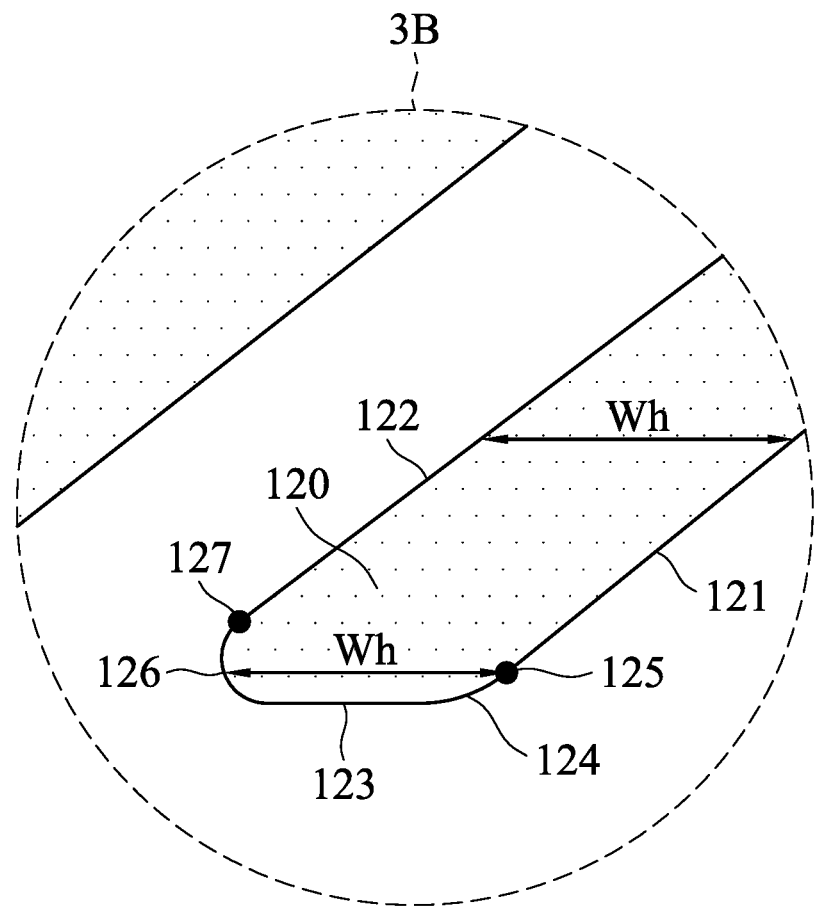
FIG. 3B is an enlarged view of portion 3B of FIG. 3A.

With reference to FIGS. 3A and 3B, in another embodiment, the curved side 123 has a second round corner 126. A third round corner end 127 of the second round corner 126 is connected to the second side 122. The second round corner 126 has a second curvature radius greater than zero. The first round corner 124 is located between the second round corner 126 and the first side 121. The second curvature radius is smaller than the first curvature radius.

With reference to FIG. 2A, the display device further comprises a first sub-pixel area R1 and a second sub-pixel area R2 adjacent to the first sub-pixel area R1. The first electrode 100 is disposed in the first sub-pixel area R1. The second electrode 200 is disposed on the first substrate 10 and located in the second sub-pixel area R2. The second electrode 200 comprises a second main portion 210 and a plurality of second extending portions 220, and the second extending portions 220 are connected to the second main portion 210. A common electrode 40 is disposed on the first substrate 10 and at least partial of the common electrode 40 located between the first sub-pixel area R1 and the second sub-pixel area R2. In one embodiment, the first extending portions 120 extend from the first main portion 110 toward the common electrode 40. An electrical potential (voltage) difference between the first electrode 100 and the second electrode 200 is greater than zero.

In more detail, the display device further comprises a plurality of scan lines SL and a plurality of data lines DL. With reference to FIGS. 2A and 2B, the two adjacent scan lines and the two adjacent data lines defined a pixel area PA, and at least partial of the first sub-pixel area R1 and the second sub-pixel area R2 are located in the pixel area PA.

With reference to FIGS. 2A and 2B, a virtual line L is parallel to the common electrode 40. A second round corner end 128 of the first round corner 124 is a tangent point of the curved structure 123 and the virtual line L.

With reference to FIG. 2A, in one embodiment, the horizontal width Wh of a part of the first extending portions 120 relatively adjacent to the common electrode 40 is shorter than the horizontal width Wh of a part of the first extending portions 120 relatively adjacent to the first main portion 110. The horizontal width Wh is the line width parallel to the common electrode 40 or the scan line SL.

Utilizing the curved side mentioned above, the arrangement of the liquid-crystal molecules is improved, and the light transmittance and the response time are increased. When the first curvature radius is greater than zero and smaller than 10 µm, the light transmittance is increased under any driving voltage. In another embodiment, the first curvature radius could be smaller than 10 µm Additionally, the curved side of the embodiment is relatively retracted compared to the conventional structure. When the display device is recovered from being pressed (for example, by a finger) in a short period, the liquid-crystal molecules have greater space, and the liquid-crystal molecules return to their original positions rapidly, and the retention time is decreased. Similarly, the design of second round corner also improves retention time. However, when the first curvature radius is greater than 10 µm, the light transmittance may be decreased. Therefore, in another embodiment, the first curvature radius be greater than zero and smaller than or equal to 5 µm.

With reference to FIG. 2A, in one embodiment, a part of the first extending portions 120 and a part of the second extending portions 220 are staggered relative to common electrode 40. Specifically, the parts of the first extending portions 120 adjacent to the vertical axis of the first main portion 110 are arranged corresponding to the second extending portions 220 adjacent thereto. The parts of the first extending portions 120 away from the vertical axis of the first main portion 110 are staggered with the second extending portions 220 adjacent thereto, the first extending portions 120 and the second extending portions 220 are positioned at the opposite side of the common electrode 40. In other words, a part of the first extending portions 120 with relatively longer length are staggered with the second extending portion 220 adjacent thereto. In another embodiment, two of the first extending portions 120 with the longest length are staggered with the second extending portion 220 adjacent thereto.

Figure 4A:
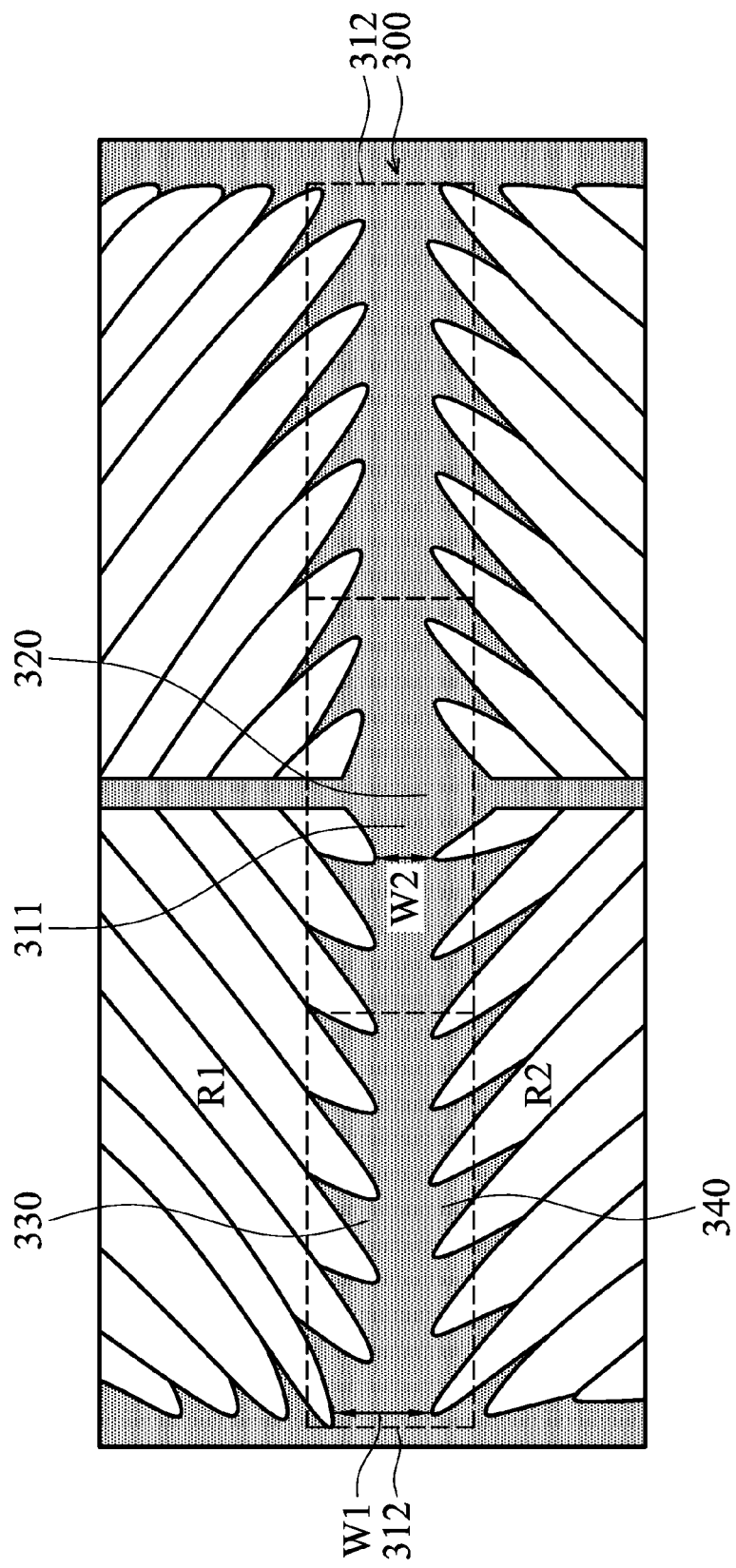
FIG. 4A shows a disclination line structure of an embodiment.

With reference to FIG. 4A, in one embodiment, a disclination line structure 300 is formed between the first sub-pixel area R1 and the second sub-pixel area R2. The disclination line structure 300 comprises a first disclination line area 311 and two second disclination line areas 312. The first disclination line area 311 is located between the two second disclination line areas 312. The width W1 of one of the second disclination line areas 312 away from an end of the first disclination line area 311 perpendicular to an extending direction of the common electrode 40 is greater than the minimum width W2 of the first disclination line area 311 perpendicular to the extending direction of the common electrode 40. With reference to FIG. 4C, in this embodiment, the first extending portion 120 and the second extending portion 220 are retracted in the second disclination line areas 312. The first extending portion 120 is retracted upwardly, and the second extending portion 220 is retracted downwardly. Therefore, the width of the second disclination line areas 312 away from an end of the first disclination line area 311 perpendicular to an extending direction of the common electrode 40 is greater than the minimum width of the first disclination line area 311 perpendicular to the extending direction of the common electrode 40.

Figure 4B:
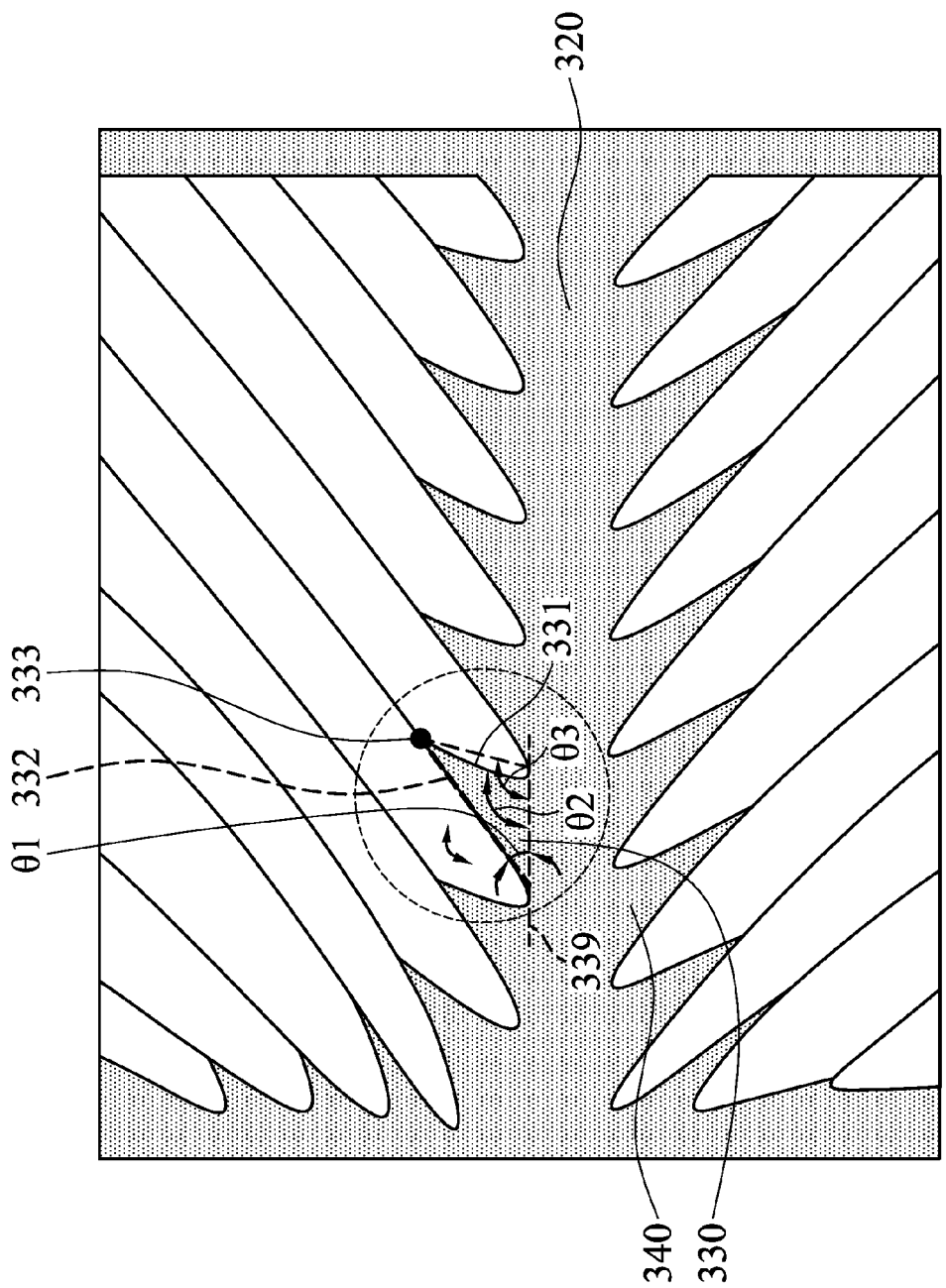
FIG. 4B shows detailed structure of the disclination line structure of the embodiment.
Figure 4C:
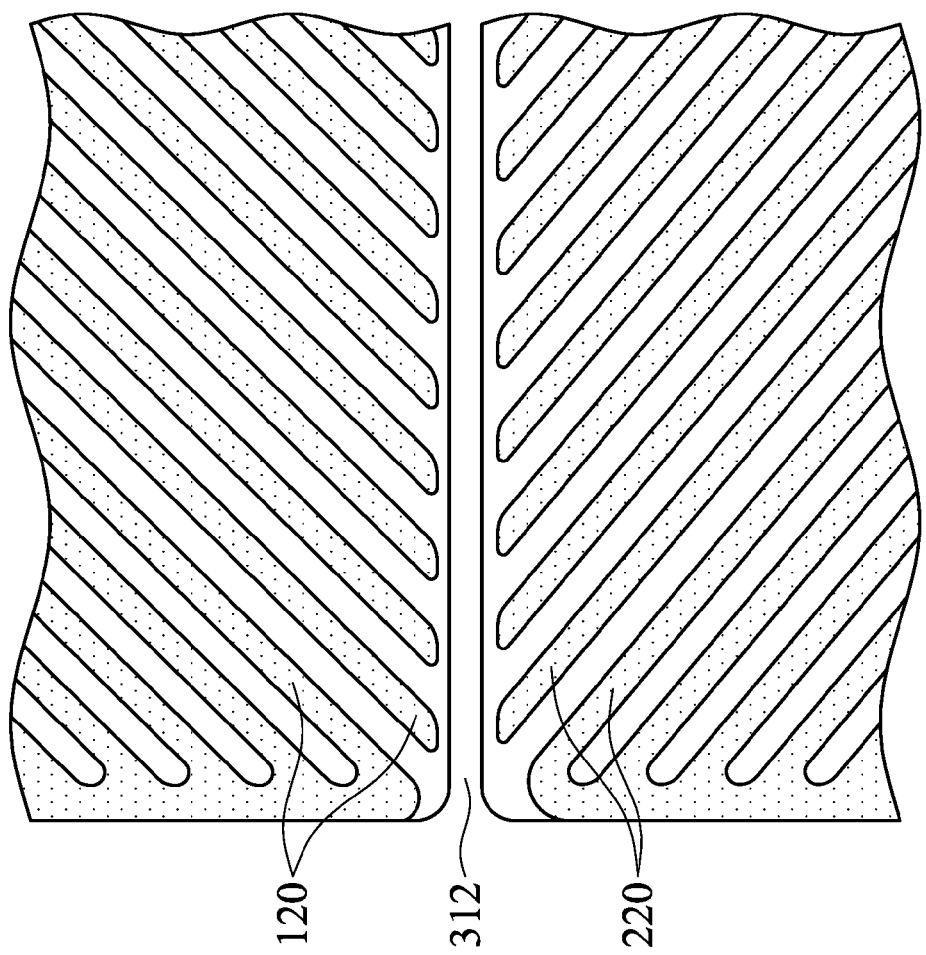
FIG. 4C shows the disclination line structure corresponding to the display device.
Figure 4D:
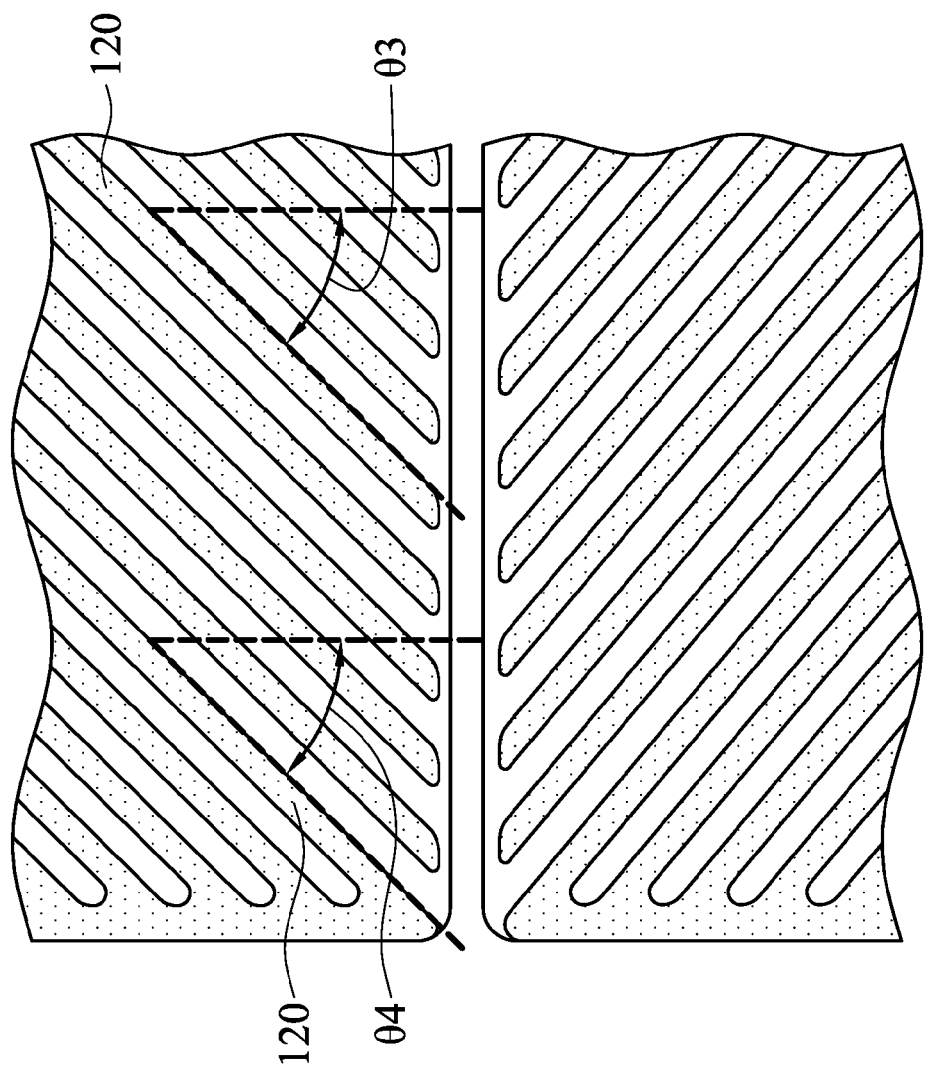
FIG. 4D shows a display device of a modified embodiment.

With reference to FIG. 4D, in one embodiment, the tilt angles of the first extending portions 120 are gradually changed. For example, the tilt angle θ3 of the first extending portions 120 adjacent to the vertical axis of the first main portion 110 is 45 degrees, and the tilt angle θ4 of the first extending portions 120 away from the vertical axis of the first main portion 110 is greater than 45 degrees. Therefore, the width of the second disclination line areas 312 away from an end of the first disclination line area 311 perpendicular to an extending direction of the common electrode 40 is greater than the minimum width of the first disclination line area 311 perpendicular to the extending direction of the common electrode 40.

Additionally, by modifying the distance between the first extending portion 120 and the second extending portion 220 and the data lines adjacent thereto, the width of one of the second disclination line areas 312 away from an end of the first disclination line area 311 perpendicular to an extending direction of the common electrode 40 is greater than the minimum width of the first disclination line area 311 perpendicular to the extending direction of the common electrode 40. By modifying the cell gap and the pre-tilt angle, the width of one of the second disclination line areas 312 away from an end of the first disclination line area 311 perpendicular to an extending direction of the common electrode 40 is greater than the minimum width of the first disclination line area 311 perpendicular to the extending direction of the common electrode 40. Particularly, the common electrode 40 between the first sub-pixel area R1 and the second sub-pixel area R2 is parallel to the scan lines. Therefore, the width of the second disclination line areas 312 away from an end of the first disclination line area 311 perpendicular to an extending direction of the scan line is greater than the minimum width of the first disclination line area 311 perpendicular to the extending direction of the scan line.

With reference to FIG. 4A, in one embodiment, the disclination line structure 300 comprises a disclination line main portion 320 and a plurality of top indentations 330 and bottom indentations 340 respectively located at two sides of the disclination line main portion 320. A portion of the top indentations 330 are staggered with the bottom indentations 340 corresponding thereto. In one embodiment, the top indentations 330 and the bottom indentations 340 are hook-shaped. In more detail, the first disclination line area 311 comprises at least four top indentations 330 located on both sides of the vertical axis of the first main portion (two top indentations on right side and two top indentations on left side) and at least four bottom indentations 340 located on both sides of the vertical axis of the second main portion (two bottom indentations on the right side and two bottom indentations on the left side).

Figure 4E:
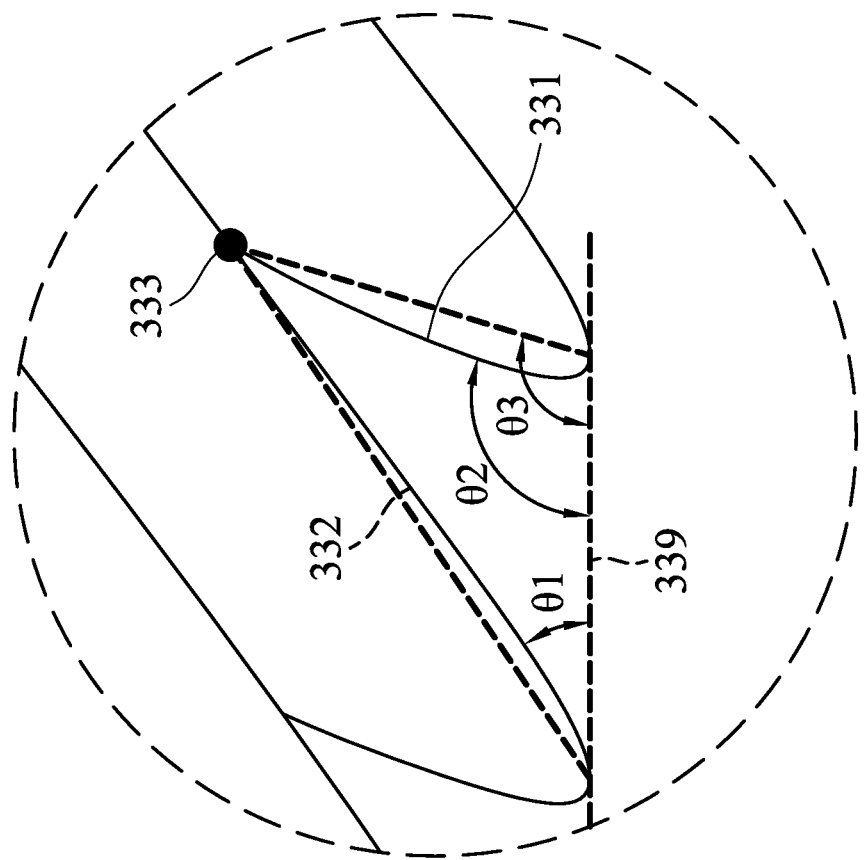
FIG. 4E is an enlarged view of FIG. 4A.

With reference to FIGS. 4B and 4E, a virtual line segment 339 is defined as the location where one of the top indentations 330 connect to the disclination line main portion 320. The virtual line segment 339 is parallel to the common electrode 40. One of the top indentations 330 comprises a first disclination line side 331 and a second disclination line side 332. The first disclination line side 331 is relatively adjacent to the center of the disclination line main portion 320. The second disclination line side 332 is relatively away from the center of the disclination line main portion 320. An included angle θ2 between the first disclination line side 331 and the virtual line segment 339 is greater than an included angle θ1 between the second disclination line side 332 and the virtual line segment 339, and the first included angle θ1 and the second included angle θ2 are inside the top indentation In another embodiment, first disclination line side 331 connects the second disclination line side 332 at a turning point 333, a connection line is defined as between the turning point 333 and an end of the first disclination line side 331 away from the turning point 333, and an included angle θ3 between the connection line and the virtual line segment 339 is greater than an included angle θ1 between the second disclination line side 332 and the virtual line segment 339, the included angle θ3 is obtuse angle.

With reference to FIG. 4E, in one embodiment, the first disclination line side 331 connects the second disclination line side 332 at a turning point 333, and an area of the top indentation 330 is smaller than a triangle area enclosed by two ends of the virtual line segment 339 and the turning point 333 (as presented in dot lines). In one embodiment, the first disclination line side 331 is curved.

The disclination line structure 300 decreases retention time. The top indentations 330 and the bottom indentations 340 can be defined by the binarization image of the disclination line. In one embodiment, the included angle θ1 of each of the top indentations 330 away from the center of the disclination line main portion is smaller than the included angle θ2 adjacent to the center of the disclination line main portion. In one embodiment, parts of the top indentations 330 are staggered with the corresponding bottom indentations 340. Additionally, the top indentations 330 away from the center of the disclination line main portion are staggered with the corresponding bottom indentations 340, and the visual angle is made uniform.

Figure 5A:
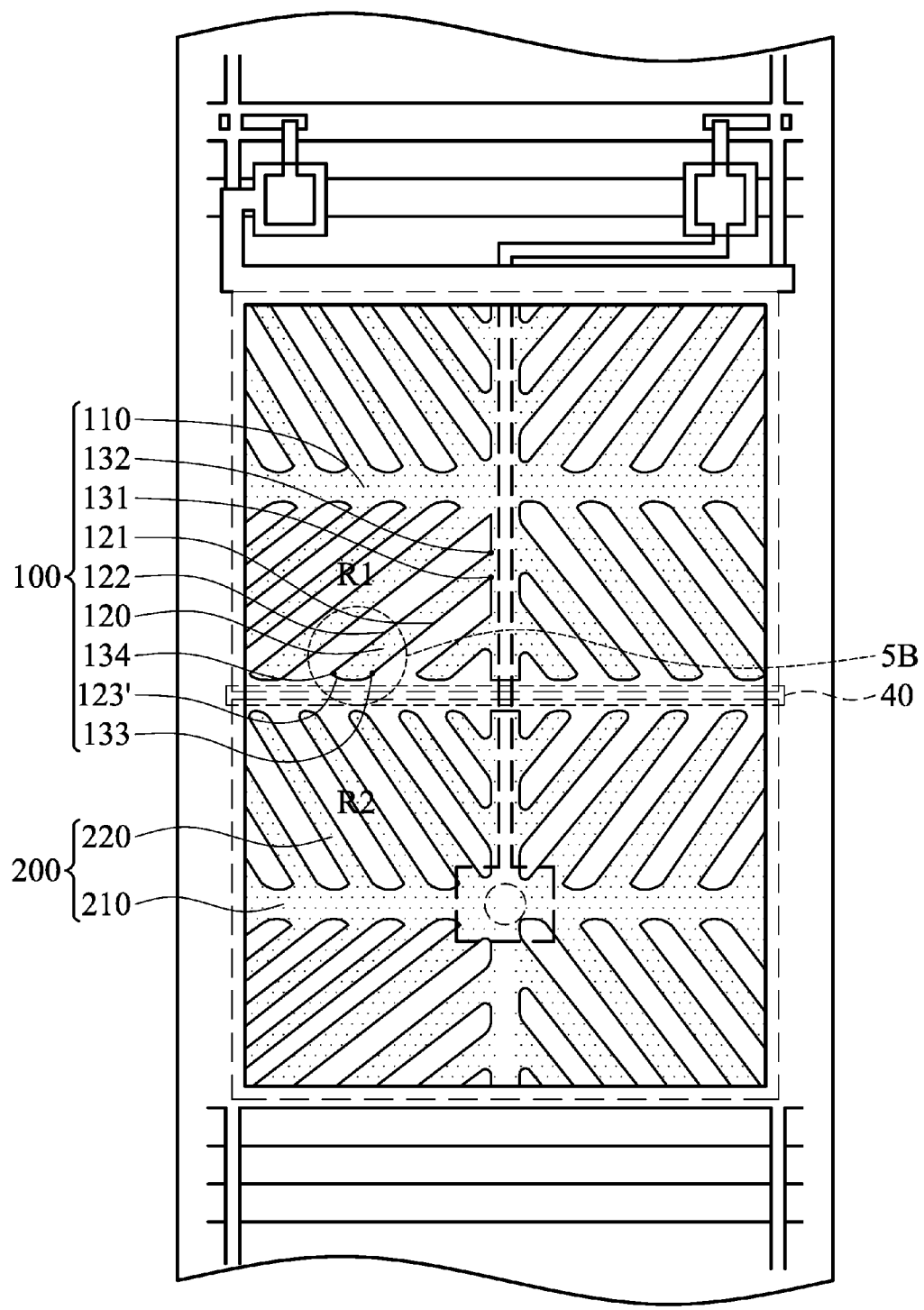
FIG. 5A shows the main structure of the display device of yet another embodiment.
Figure 5B:
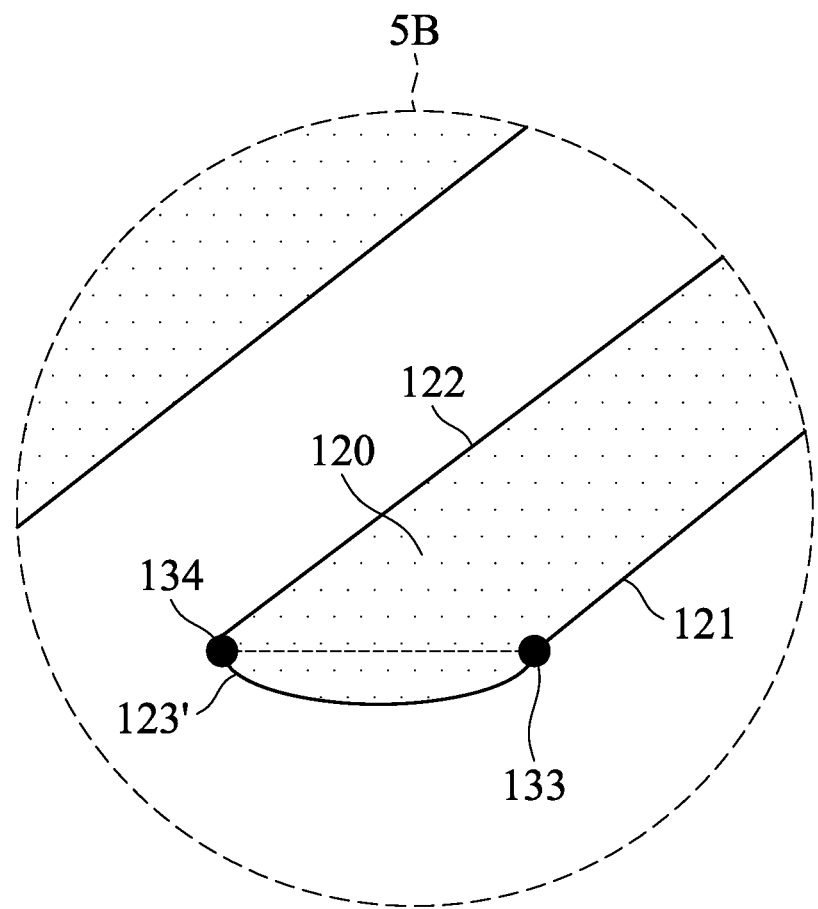
FIG. 5B is an enlarged view of portion 5B of FIG. 5A.

With reference to FIGS. 5A and 5B, in another embodiment, the first electrode 100 comprises a first main portion 110 and a plurality of first extending portions 120. The first extending portions 120 are connected to the first main portion 110. At least one of the first extending portions 120 comprises a first side 121, a second side 122, and a curved side 123'. The first side 121 is parallel to the second side 122. The curved side 123' connects the first side 121 and the second side 122. The first side 121 connects to the first main portion 110 at a first end point 131. The second side 122 connects to the first main portion 110 at a second end point 132. The curved side 123' connects to the first side 121 at a third end point 133. The curved side 123' connects to the second side 122 at a fourth end point 134. The area of the first extending portion 120 is greater than a quadrilateral area enclosed by the first end point 131, the second end point 132, the third end point 133, and the fourth end point 134.

Figure 6:
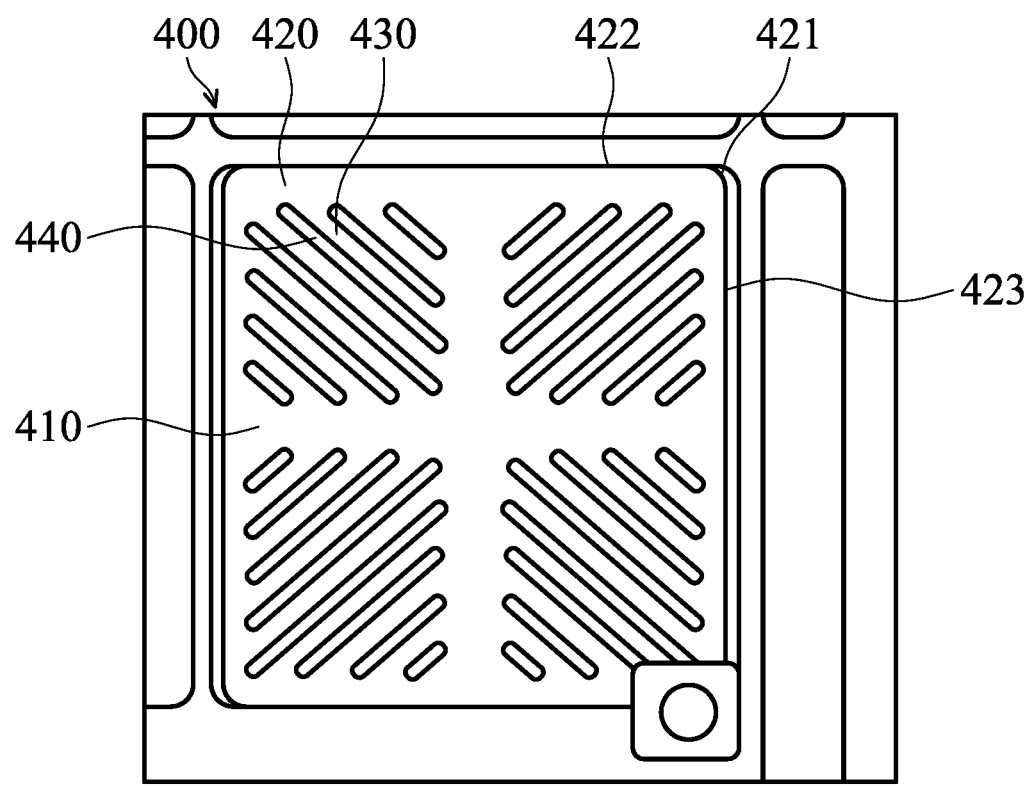
FIG. 6 shows the main structure of the display device of another embodiment, wherein the display device is a close-type indium tin oxide (ITO) electrode display device.

The embodiment can also be utilized in a close-type indium tin oxide (ITO) electrode display device. In this embodiment, a common electrode, an insulation layer and a first electrode are sequentially disposed on the first substrate. An opposite electrode is disposed on the second substrate. With reference to FIG. 6, the first electrode 400 comprises a cross-shaped main portion 410, a peripheral portion 420 and a plurality of extending portions 430 connected to the main portion 410 and the peripheral portion 420. A gap 440 is formed between the extending portions 430. The peripheral portion 420 comprises at least one curved side 421. In one embodiment, the peripheral portion 420 comprises a fifth side 422 and a sixth side 423. The fifth side 422 is parallel to the horizontal axis of the cross-shaped main portion 410. The sixth side 423 is parallel to the vertical axis of the cross-shaped main portion 410. The curved side 421 connects the fifth side 422 at a fifth tangent point, and the curved side 421 connects the sixth side 423 at a sixth tangent point.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the disclosure has been described by way of example and in terms of the preferred embodiments, it is to be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A display device, comprising:
a first substrate;
a second substrate;
a liquid-crystal layer, disposed between the first substrate and the second substrate;
a first sub-pixel area;
a second sub-pixel area adjacent to the first sub-pixel area;
a first electrode, disposed on the first substrate and located in the first sub-pixel area, wherein the first electrode comprises a first main portion and a plurality of first extending portions connected to the first main portion;
a second electrode, disposed on the first substrate and located in the second sub-pixel area, wherein the second electrode comprises a second main portion and a plurality of second extending portions connected to the second main portion; and
an opposite electrode, disposed on a side of the second substrate facing the first substrate,
wherein at least one of the first extending portions comprises a first side, a second side and a curved side, the curved side connects the first side and the second side, and the curved side has a first curvature radius greater than zero and smaller than 10 um,
wherein a part of the first extending portions are staggered with the second extending portions adjacent thereto, and wherein the curved side has a second curvature radius, and the second curvature radius is smaller than the first curvature radius.

2. The display device as claimed in claim 1, wherein the first curvature radius is smaller than or equal to 5 µm.

3. The display device as claimed in claim 1, wherein the first side is relatively adjacent to a vertical axis of the first main portion, the second side is relatively away from the vertical axis of the first main portion, the first curvature radius corresponds to a first round corner, the second curvature radius corresponds to a second round corner, and the first round corner is located between the first side and the second round corner.

4. The display device as claimed in claim 1, further comprising a common electrode, wherein common electrode is disposed on the first substrate, and at least partial of the common electrode is located between the first sub-pixel area and the second sub-pixel area, and an electrical potential difference between the first electrode and the second electrode is greater than zero.

5. The display device as claimed in claim 4, wherein the first extending portions extend from the first main portion toward the common electrode, a horizontal width of a part of one of the first extending portions relatively adjacent to the common electrode is smaller than a horizontal width of an another part of the one of the first extending portions relatively adjacent to the first main portion.

6. The display device as claimed in claim 1, wherein a part of the first extending portions adjacent to a vertical axis of the first main portion are arranged corresponding to the second extending portions adjacent thereto, and the part of the first extending portions away from the vertical axis of the first main portion are staggered with the second extending portions adjacent thereto.

7. The display device as claimed in claim 4, wherein a disclination line structure is formed between the first sub-pixel area and the second sub-pixel area, the disclination line structure comprises a first disclination line area and two second disclination line areas, the first disclination line area is located between the two second disclination line areas, a width of one of the second disclination line areas away from an end of the first disclination line area perpendicular to an extending direction of the common electrode is greater than the minimum width of the first disclination line area perpendicular to the extending direction of the common electrode.

8. The display device as claimed in claim 1, wherein a disclination line structure is between the first sub-pixel area and the second sub-pixel area, the disclination line structure comprises a disclination line main portion and a plurality of top indentations and bottom indentations respectively located at two sides of the disclination line main portion, and a portion of the top indentations are staggered with the bottom indentations corresponding thereto.

9. The display device as claimed in claim 8, wherein at least a portion of the plurality of the top indentations are hook-shaped.

10. The display device as claimed in claim 1, further comprising a plurality of scan lines and a plurality of data lines, the two adjacent scan lines and the two adjacent data lines defined a pixel area, and at least partial of the first sub-pixel area and the second sub-pixel area are located in the pixel area.

11. A display device, comprising:
a first substrate;
a second substrate;
a liquid-crystal layer, disposed between the first substrate and the second substrate;
a first sub-pixel area;
a second sub-pixel area adjacent to the first sub-pixel area;
a first electrode, disposed on the first substrate and located in the first sub-pixel area, wherein the first electrode comprises a first main portion and a plurality of first extending portions connected to the first main portion;
a second electrode, disposed on the first substrate and located in the second sub-pixel area, wherein the second electrode comprises a second main portion and a plurality of second extending portions connected to the second main portion; and
an opposite electrode, disposed on a side of the second substrate facing the first substrate,
wherein at least one of the first extending portions comprises a first side, a second side and a curved side, the curved side connects the first side and the second side, the first side connects to the first main portion at a first end point, the second side connects to the first main portion at a second end point, the curved side connects to the first side at a third end point, the curved side connects to the second side at a fourth end point, and an area of the first extending portion is greater than an quadrilateral area enclosed by the first, second, third, and fourth end points, and the curved side has a first curvature radius greater than zero and smaller than 10 um,
wherein a part of the first extending portions are staggered with the second extending portions adjacent thereto, and wherein the curved side has a second curvature radius, and the second curvature radius is smaller than the first curvature radius.

12. The display device as claimed in claim 11, further comprising a common electrode, wherein the common electrode is disposed on the first substrate and located between the first sub-pixel area and the second sub-pixel area, and an electrical potential difference between the first electrode and the second electrode is greater than zero.

13. The display device as claimed in claim 11 a wherein two of the first extending portions with a longest length are staggered with the second extending portion adjacent thereto.

14. The display device as claimed in claim 12, wherein a disclination line structure is formed between the first sub-pixel area and the second sub-pixel area, the disclination line structure comprises a first disclination line area and two second disclination line areas, the first disclination line area is located between the two second disclination line areas, a width of one of the second disclination line areas away from an end of the first disclination line area perpendicular to an extending direction of the common electrode is greater than the minimum width of the first disclination line area perpendicular to the extending direction of the common electrode.

15. The display device as claimed in claim 11, wherein a disclination line structure is formed between the first sub-pixel area and the second sub-pixel area, the disclination line structure comprises a disclination line main portion and a plurality of top indentations and bottom indentations located on two sides of the disclination line main portion, and partial of the top indentations are staggered with the bottom indentations corresponding thereto.

16. A display device, comprising:
a first substrate;
a second substrate;
a liquid-crystal layer, disposed between the first substrate and the second substrate;
a first sub-pixel area; and
a second sub-pixel area,
wherein a disclination line structure is formed between the first sub-pixel area and the second sub-pixel area, the disclination line structure comprises a disclination line main portion, a plurality of top indentations, and a plurality of bottom indentations located at two sides of the disclination line main portion, and a portion of the top indentations are staggered with the bottom indentations corresponding thereto,
wherein a virtual line segment is defined as a location where one of plurality of top indentations connects to the disclination line main portion, the virtual line segment is parallel to an extending direction of the disclination line main portion, the one of the top indentations comprises a first disclination line side and a second disclination line side, the first disclination line side is relatively adjacent to a center of the disclination line main portion, the second disclination line side is relatively away from the center of the disclination line main portion, and a first included angle between the first disclination line side and the virtual line segment is greater than a second included angle between the second disclination line side and the virtual line segment.

17. The display device as claimed in claim 16, wherein the first disclination line side connects to the second disclination line side at a turning point, and an area of the top indentation is smaller than a triangle area defined by two ends of the virtual line seizment and the turning point.

18. The display device as claimed in claim 16, wherein the first disclination line side is curved.

19. The display device as claimed in claim 16, wherein the first disclination line side connects to the second disclination line side at a turning point, a connection line is defined as a line between the turning point and an end of the first disclination line side away from the turning point, and a third included angle between the connection line and the virtual line segment is greater than the second included angle between the second disclination line side and the virtual line segment.

* * * * *